United States Patent [19]

Kauffman et al.

[11] Patent Number: 4,635,699
[45] Date of Patent: Jan. 13, 1987

[54] RETRACTABLE SAFETY SHIELD

[75] Inventors: James C. Kauffman; Glenn F. Thompson, both of Tucson, Ariz.

[73] Assignee: Covenant Manufacturing Co., Tucson, Ariz.

[21] Appl. No.: 597,514

[22] Filed: Apr. 6, 1984

[51] Int. Cl.$^4$ .................................... E05D 15/12
[52] U.S. Cl. ...................... 160/211; 160/223; 160/332
[58] Field of Search ............... 160/211, 197, 202, 216, 160/222, 332, 223, 224, 225, 226, 227, 228

[56] References Cited

U.S. PATENT DOCUMENTS

| 141,677 | 8/1873 | Tuttle | 160/216 X |
|---|---|---|---|
| 811,974 | 2/1906 | Tuthill | 160/202 X |
| 856,588 | 6/1907 | Jones | 160/228 X |
| 1,217,550 | 2/1917 | Alwine | 144/251 |
| 1,534,636 | 4/1925 | Craig | 160/224 |
| 1,701,848 | 2/1929 | Hickman | 160/225 |
| 1,812,452 | 6/1931 | Shaw | 144/251 |
| 1,813,652 | 7/1931 | Abrams et al. | 160/225 |
| 2,131,874 | 10/1938 | Griffin | 160/216 X |
| 2,201,197 | 5/1940 | Minor | 160/222 X |
| 2,490,612 | 12/1949 | Ballard | 160/225 |
| 2,521,499 | 9/1950 | Boisvert | 144/251 |
| 2,595,329 | 5/1952 | Brooks | 160/222 X |
| 2,714,926 | 8/1955 | Nichta | 160/191 |
| 3,063,320 | 11/1962 | Beagley | 83/397 |
| 3,165,144 | 1/1965 | Kirby | 160/223 X |
| 3,366,012 | 1/1968 | Richter | 90/11 |
| 3,568,567 | 3/1971 | Seck et al. | 90/11 |
| 3,750,737 | 8/1973 | Woodward | 160/202 X |
| 3,824,890 | 7/1974 | Zettler et al. | 90/11 |
| 3,859,950 | 1/1975 | York | 144/251 |
| 3,885,616 | 5/1975 | Berkowitz | 160/222 X |
| 3,957,251 | 5/1976 | McCracken | 160/223 X |
| 4,030,364 | 6/1977 | Atwood | 72/389 |
| 4,039,021 | 8/1977 | Moritz et al. | 160/202 |
| 4,062,391 | 12/1977 | Piazzola | 144/251 |
| 4,096,789 | 6/1978 | Blessinger | 83/478 |
| 4,206,672 | 6/1980 | Smith | 83/415 |
| 4,297,928 | 11/1981 | Benuzzi | 83/57 |
| 4,492,263 | 1/1985 | Gebhard | 160/222 X |

Primary Examiner—Ramon S. Britts
Assistant Examiner—David M. Purol
Attorney, Agent, or Firm—LaValle D. Ptak

[57] ABSTRACT

A retractable safety shield is made of a plurality of telescoping support members, each having an identical cross-section and capable of formation by extrusion. Each of the telescoping support members has an elongated slot cut through it for a substantial portion of the length of the support members. Parallel guide grooves are formed in one surface on opposite sides of this slot and mating parallel ribs are formed on the other surface of each of the support members. The members are slidably interconnected with one another by means of rivets through the slots to cause the guide ribs on one support member to slidably nest within the guide grooves of the adjacent support member. Flexible shields are attached to the lower edges of each of the guide members to extend downwardly toward the work surface with which the device is used.

19 Claims, 5 Drawing Figures

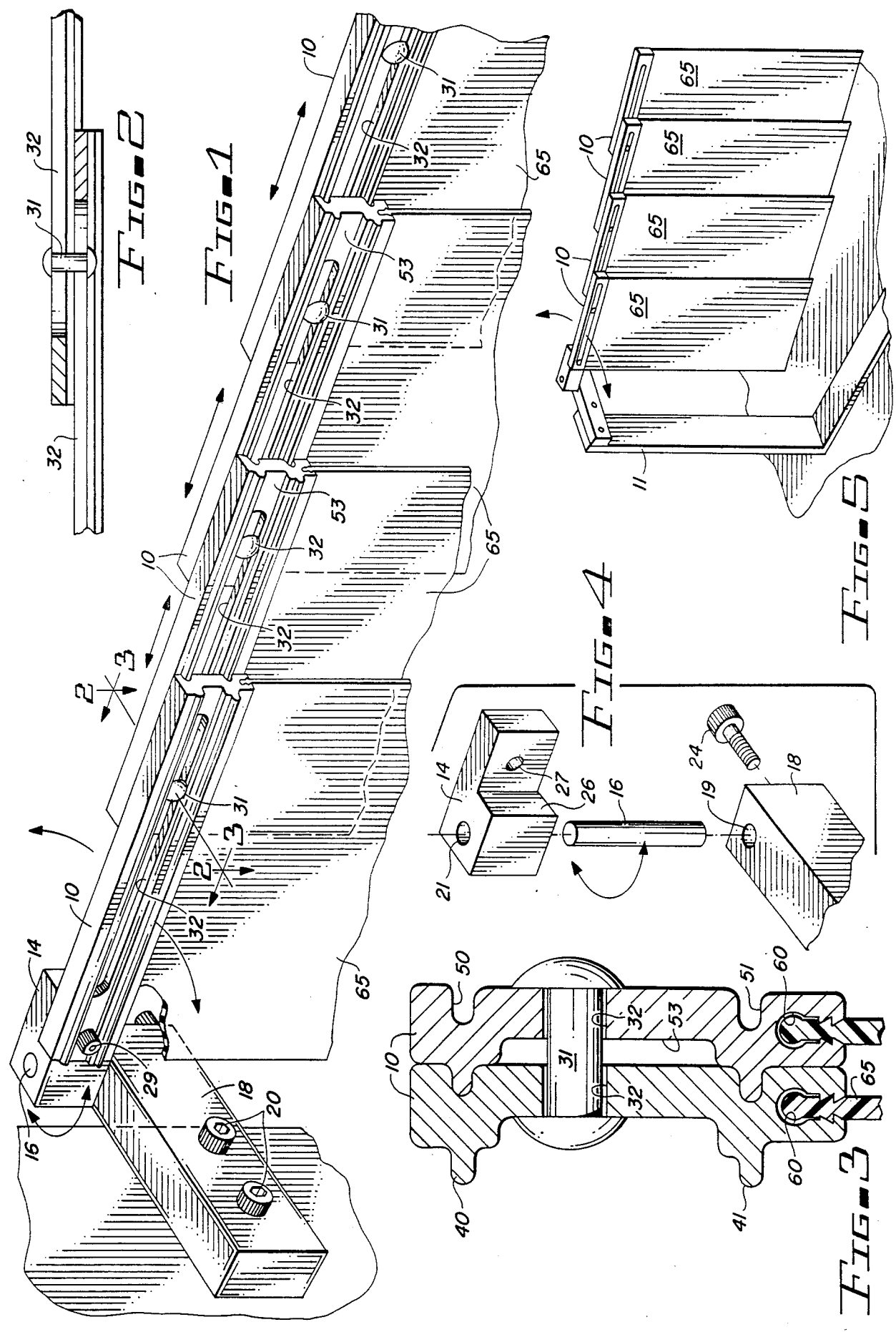

RETRACTABLE SAFETY SHIELD

BACKGROUND OF THE INVENTION

In the use of machine tools, welding operations, painting operations, and some chemical processes, it frequently is necessary to provide protective shielding between the operator of the machines or equipment and the point of operation. Such shielding functions as a chip retainer, spark arrest, or splash guard during use of the machine to prevent possible injury to the machine operator. In addition, shielding assists in confining the waste products of machining to a relatively small area which facilitates clean-up.

Machine shops are most prone to potential injury, particularly to eyes, in machine operations such as metal removal in a variety of forms, such as drilling, grinding, sawing, milling, die-punching, shearing, boring and the like, and in spray-mist coolant applications and other functions. In grinding operations and welding operations, there is substantial concern about spark arrest, both for protection of the operators of such machines and to minimize the potential for the creation of fires due to sparks. In addition, high-arc flash in welding areas may cause severe eye burn, whether the individual is looking directly at the welding flash or inadvertently eyes a flash reflecting off a near wall or other structure. In such instances, a non-transparent shield, either portable or machine-mounted, is required to prevent injury.

The need for protective shielding for machines and other operations of the types mentioned above long has been known. A variety of attempted solutions have been made. From a safety standpoint, the ideal shield is a permanent one located between the machine operator and the workpiece and cutting head, grinder, or the like, of the machine. This is possible to achieve in some automated or semi-automated operations. For many applications, however, a permanently located shield is not possible or may be impractical. Also, it is frequently desirable for an operator to have direct access to the operating point of a machine for various purposes, such as changing cutting heads or checking on work progress. If permanently installed shields are located between the operator and the operating head of such a machine, it is necessary first to remove the shield before the operator can perform the desired operation or adjustment to the machine.

Consequently, movable or retractable shields have been devised for specialty applications in the past. Three patents which are directed to such protective covers or shields are the patents to Moritz, U.S. Pat. No. 4,039,021; Zettler, U.S. Pat. No. 3,824,890; and Richter, U.S. Pat. No. 3,366,012. The Moritz patent discloses a protective cover for the guiding path of machine tools. This patent utilizes a cover in the form of several rigid overlapping cover plates telescopically movable into and out of each other, and each successively decreasing in size from one end to the other end of the system. The plates are moved back and forth by two sets of pairs of retracting arms interconnecting the top and bottom edges of the plates. A number of rods, cylinders, pistons, cams, and other components are necessary to effect the shield movement. The apparatus used in Moritz is generally a pantograph-type of structure. Because of the nature of the structure, it is necessary that the protective plates are rigid plates.

The Richter and Zettler patents are somewhat similar to one another, and both disclose telescoping structures using a pantograph support member. Richter discloses a plurality of overlapping rigid plates which are used to catch chips and cutting fluid from the cutting head of a tool. The Richter device is made to extend at an angle generally vertically from an area in the tool base to a point located directly beneath the cutting head of the tool. Rigid plates are involved and each of the plates is connected to one of the segments of a pantograph. This is a fairly expensive structure and one that is complex to manufacture. The Zettler patent discloses a device in the form of a chip guard for a horizontal spindle machine tool. A pantograph bellows surrounds the top and sides of the tool operator head. Because of the necessity for pantographs located on both sides of the device, the structure is cumbersome and expensive. It also is not flexible in the vertical direction, due to the rigidity imparted by the pantograph members.

Other attempts for providing guards or shields to prevent splinters and the like from being thrown from a saw or cutting tool out into the surrounding area are disclosed in the patents to Blessinger, U.S. Pat. No. 4,096,789; Seck, U.S. Pat. No. 3,568,567; and Benuzzi, U.S. Pat. No. 4,297,928. The guard devices or shield devices disclosed in these patents all are in the form of permanently mounted, non-retractable holders from which movable or flexible guard strips are hung surrounding the tool head or operating area. In the Blessinger patent, a box-like structure is placed over the top of a saw and flexible strips are hung downwardly from the perimeter of the box above the work area. This permits workpieces to pass underneath the strips, bending or moving them accordingly as the workpieces are fed into the saw. In the Seck device, a curtain made of chain mesh hangs downwardly from a holder located above the tool head and workpiece to partially surround the machining zone to confine movement of shavings thrown off by the workpiece. The flexibility of the chain curtain permits it to accomodate itself around workpieces of different shapes. The Benuzzi patent discloses a shield in the form of longitudinal rods for supporting a plurality of slats hingedly mounted side by side for swinging movement through a pre-determined angle to accomodate workpieces of different thicknesses passing beneath the slats.

Although the Moritz, Zettler and Richter patents all are directed to collapsible shields, these devices are not inexpensive to construct and, further, do not have a wide degree of flexibility which permits their use on a variety of different types of machines or in a variety of different applications. Consequently, it is desirable to provide a retractable safety shield which is simple to construct, easy to use, and which is capable of nearly universal application to a wide variety of machines and other uses.

SUMMARY OF THE INVENTION

It is an object of this invention to provide an improved safety shield.

It is another object of this invention to provide an improved retractable safety shield.

It is an additional object of this invention to provide an improved retractable safety shield using telescoping support members.

It is a further object of this invention to provide an improved retractable safety shield for machine tools and the like, utilizing a plurality of identical telescoping support members slidably interconnected with one another.

It is yet another object of this invention to provide an improved retractable safety shield having a plurality of telescoping support members from which flexible shield members are suspended to hang downwardly toward the work surface of a machine on which the safety shield is used.

In accordance with a preferred embodiment of this invention, a retractable safety shield comprises a plurality of elongated support members slidably overlapping one another for telescopic movement relative to one another. An elongated slot is formed through at least some of the members for a substantial portion of the length of such members and extends in the direction of relative movement of the support members. An attaching pin passes through the slots in adjacent members for slidable movement therein to secure the members together. Additional structure is provided to prevent the members from pivoting about the pins, and shields are attached to the lower edges of the support members and hang downwardly from them.

BRIEF DESCRIPTION OF THE DRAWING

FIG. 1 is a perspective view of a preferred embodiment of the invention;

FIG. 2 is a cross-sectional view taken along the Line 2—2 in FIG. 1, illustrating details of the preferred embodiment;

FIG. 3 is a cross-sectional view taken along the Line 3—3 of FIG. 1, illustrating additional details of the embodiment shown in FIG. 1;

FIG. 4 is a partially exploded view of a portion of the structure shown in FIG. 1; and FIG. 5 is a perspective view of one of several possible types of installation of the device shown in FIG. 1.

DETAILED DESCRIPTION

Reference now should be made to the drawing in which the same reference numbers are used in the different figures to indicate the same components.

The retractable safety shield, which is shown in the embodiment illustrated in FIGS. 1 through 5, primarily is made up of a number of identical basic components. These comprise several elongated support members 10 (four of which are shown in FIGS. 1 and 5), each of which are identical to one another and which are interconnected together to provide a telescoping retractable shield which may be mounted either on a portable stand 11 (as shown in FIG. 5) or on a machine by clamp mounts or drilling and tapping, as desired. The particular mounting used is not important.

The end one of the support members 10 (shown on the left-hand end of the four support members 10 in FIGS. 1 and 5) is securely fastened to a pivot block 14 to permit the shield to be rotated about a pivot 16, if desired. FIG. 4 shows the details of the mounting of the pivot block 14 and pivot 16 onto a bracket member 18, which may be attached either to the stand 11 or to the frame of a machine by means of threaded fasteners 20 (FIG. 1). The pivot pin 16 is inserted into a hole 19 which extends into the block 18. The upper end of the pin 16 is inserted into a hole 21 through the bracket 14; and the pin may be secured in the hole 21 by brazing or welding, or it may be held in place by means of a set screw (not shown), if desired. The lower end of the pivot pin 16 is free to rotate in the hole 19, but it may be secured in a non-rotating position by means of a set screw 24, once a pre-established angular extension for the support members 10 has been established in any given installation. Obviously, if a freely rotating pivot about the pin 16 is desired, the set screw 24 may be loosened to permit such rotation. The details of this structure are shown most clearly in FIG. 4.

The mounting block 14 has a vertical shoulder 26 on it, which is approximately the width of the end of the leftmost elongated support member 10. A tapped and threaded hole 27 is placed in the center of a face adjacent the shoulder 26 and is aligned with a similar hole (not shown) in the left-hand end of the leftmost member 10. A threaded fastener 29 then is inserted through this hole in the member 10 and tightened in the threaded hole 27 to securely hold the left-hand end support member 10 in place. Because the vertical shoulder 26 abuts against the flat end of the support member 10, a very sturdy mount is provided once the threaded fastener 29 is tightened securely in the tapped hole 27.

Each of the support members 10 are mounted onto one another in an overlying relationship for telescopic movement toward and away from the support block 14 by means of double-headed rivets 31 which extend through aligned corresponding slots 32 in each of the members 10. The slots 32 are cut through the members 10 essentially at their centerlines and extend for the major portion of the length of each of the members 10. Sufficient material is left at the ends of each of the members 10 to provide for structural rigidity, as may be readily ascertained from an examination of FIG. 1. The details of the manner in which the rivets 31 interconnect adjacent pairs of the members 10 may be seen most clearly in FIGS. 2 and 3.

Since the single rivet interconnection of adjacent pairs of the members 10 would not provide a particularly stable structure, especially in the vertical direction as viewed in FIGS. 1 and 5, each of the members 10 has a pair of spaced-apart ribs 40 and 41 formed on one surface. These ribs are located on opposite sides of the slots 32 and are parallel to one another and the slot 32. On the opposite surface of each of the members 10 are a corresponding pair of parallel rib-receiving guide grooves 50 and 51, also located on opposite sides of the slots 32. These grooves 50 and 51 are aligned with the ribs 40 and 41; so that the ribs 40 and 41 on one member 10 enter into and engage the corresponding grooves 50 and 51 on the adjacent overlapping member 10. This is shown most clearly in the cross-sectional view of FIG. 3. Consequently, the use of a single rivet 31, coupled with the interengaged ribs 40 and 41 in the grooves 50 and 51, results in a structure which is extremely stable and which prevents rotation of the members 10 relative to one another about the rivets 31.

In addition, a recessed channel 53, located between the ribs 40 and 41 on the same surface as the ribs, permits clearance for the heads of the rivets 31 when the retractable shield members are collapsed together in their retracted position. Otherwise, the heads of the rivets 31 could cause some frictional interference with adjacent support members 10 when the retractable support members were collapsed to their shortest fully retracted position.

The lower edge of each of the members 10 has a shield support slot 60 in it with an enlarged upper portion and inwardly directed elongated toothed ribs, as shown most clearly in FIG. 3. The slots 60 are used to hold flexible shield panel members 65 in place to hang downwardly from the support members 10, as shown in FIGS. 1, 3, and 5.

Typically, the panels 65 are made of rubber, reinforced rubber, or flexible plastic material, to allow workpieces to slide under them during machining operations. In addition, the panels 65 need not each be a single width panel for each of the members 10 but may comprise a number of narrow strips mounted side by side in the grooves 60, if increased flexibility for odd-sized or different sized workpieces is desired. In addition, the panels 65 placed in different ones of the support members 10 may have different lengths, depending upon the particular application which is being made of the retractable shield assembly. Whenever a panel 65 breaks or becomes worn, it may be removed from the holding slot 60 and replaced with a new panel 65.

From an examination of FIG. 1, it may be seen that the telescoping assembly of the support members 10 is capable of being collapsed to a total overall length which is only slightly greater than the length of the leftmost member 10 itself. In an actual embodiment which has been constructed, members 10 were interconnected in the manner shown in FIG. 1. Each of these members had a length of 6¼ inches and the slots 32 were selected to permit a full extension to a length of 25 inches. The retracted or shortest collapsed length of this device was 7 inches.

Because of the interrelationships of the ribs 40 and 41 with the corresponding grooves or channels 50 and 51, the device is very rigid when it is extended to any length between its minimum length and its maximum length. At the same time, it readily may be adjusted to a different length simply by pushing or pulling on one or more of the support members 10 until the desired extension is reached. Since the entire shield member is mounted on a single vertical pivot 16, it quickly may be retracted up to a closed position and then rotated away from the workpiece for easy clean-up or part inspection.

As is readily apparent from an examination of the cross-section shown in FIG. 3, the support members may be manufactured from extruded materials such as aluminum, steel, or plastic, since the members 10 have a uniform cross-section throughout their length. After extrusion to provide the basic longitudinal shape, the members 10 are cut to length and the slots 32 are cut or machined into each of the individual members 10. Although extrusion appears to be an ideal way to manufacture the support members 10, they may be made in other ways without departing from the true scope of the invention.

It also will be apparent to those skilled in the art that the embodiment which has been illustrated in the different figures of the drawing is to be considered as illustrative only, and not as limiting of the invention. For example, it is possible to construct one or more of the support members 10 with an angle in them to provide a variable angle shielding, while still retaining the general features which have been discussed above and which are shown in the drawing. In addition, curved retractable support members 10 may be used to form sections of a circle to either partially or completely surround a workpiece, if desired.

We claim:

1. A retractable shield, including in combination:
   first and second identical elongated support members slidably overlapping one another for cantilevered telescopic movement relative to one another, at least said second member having an elongated slot therethrough for a substantial portion of its length and extending in the direction of relative movement of said first and second support members;
   pin means attached to said first member and passing through the slot in said second member for slidable movement in the slot in said second member to secure said first and second members together;
   at least one elongated groove in each of said first and second support members on one surface thereof and extending throughout the entire length thereof, and a mating elongated rib extending from the opposite surface of each of said first and second support members and extending throughout the entire length thereof, the rib in said second support member fitting within the groove in said first support member for slidable overlapping telescopic movement therein, said groove and rib preventing said members from pivoting with respect to one another about said pin means; and
   first and second shield members attached to the lower edges of said first and second support members, respectively, and depending therefrom.

2. The combination according to claim 1 wherein said first and second shield members are flexible shield members.

3. The combination according to claim 2 wherein said flexible shield members are made of rubber-like material.

4. The combination according to claim 1 wherein the groove in said one support member and the rib in said other support member are parallel to the elongated slot in said second support member.

5. The combination according to claim 4 wherein said one support member has first and second parallel elongated grooves formed therein on the surface thereof which is adjacent said other support member; and said other support member has first and second parallel elongated ribs extending into said first and second grooves, respectively, when said first and second support members are secured together by said pin means.

6. The combination according to claim 5 wherein said first and second shield members are flexible shield members.

7. The combination according to claim 6 wherein said flexible shield members are made of rubber-like material.

8. The combination according to claim 7 wherein each of said first and second elongated support members has an elongated slot therethrough for a substantial portion of its length, said slot extending in the direction of relative movement of said first and second support members, and said pin means extends through the slots in said first and second support members and has an enlarged head on each end thereof wider than the width of the slots in said first and second elongated support members.

9. The combination according to claim 8 wherein said pin means comprises a rivet.

10. The combination according to claim 1 wherein each of said first and second elongated support members has an elongated slot therethrough for a substantial portion of its length, said slot extending in the direction of relative movement of said first and second support members, and said pin means extends through the slots in said first and second support members and has an enlarged head on each end thereof wider than the width of the slots in said first and second elongated support members.

11. The combination according to claim 10 wherein said pin means comprises a rivet.

12. The combination according to claim 1, further including a pivoting support block wherein said first elongated support member is attached to said pivoting support block, the axis of pivot of said pivoting support block being perpendicular to the elongated slots in said support members.

13. The combination according to claim 1 wherein each of said support members has an elongated channel on one surface thereof extending on opposite sides of the elongated slot through said member and throughout the length of each of said members, said channel having a depth sufficient to permit the head of the rivet to clear, without interference, adjacent overlapping portions of said elongated support members.

14. The combination according to claim 13, wherein said support members have identical uniform cross-sections and are formed of extruded material.

15. A retractable shield including in combination:
at least three elongated support members, each having identical cross-sections and slidably overlapping one another for cantilevered telescopic movement relative to one another, each of said members having an elongated slot therethrough for a substantial portion of its length, the slots extending in the direction of relative movement of said support members;
each of said support members having an elongated rib extending throughout the entire length thereof and parallel to the slot therein on one surface thereof and having a corresponding guide groove throughout the entire length thereof and parallel to the slot therein on the opposite surface thereof, so that when said elongated support members are placed together in a slidably overlapping position, the rib on one of said members extends into the guide groove on the immediately adjacent overlapping member to form an adjacent pair of members and the elongated slots of said overlapping members are aligned with one another;
a rivet extending through the slots in each said adjacent pair of support members, said rivets having enlarged heads on both ends thereof to hold said support membrs in slidably overlapping position with the rib of each overlapping support member held in the guide groove of the immediately adjacent support member by said rivet extending through the slots of such support members;
a plurality of shield members attached to the lower edges of at least some of said plurality of said support members and depending therefrom.

16. The combination according to claim 15 wherein each of said support members has an elongated channel on one surface thereof extending on opposite sides of the elongated slot through said member and throughout the length of each of said members, said channel having a depth sufficient to permit the heads of the rivets to clear, without interference, adjacent overlapping ones of said elongated support members.

17. The combination according to claim 15, wherein said support members have identical uniform cross-sections and are formed of extruded material.

18. The combination according to claim 17 wherein each of said support members has an elongated channel on one surface thereof extending on opposite sides of the elongated slot through said member and throughout the length of each of said members, said channel having a depth sufficient to permit the heads of the rivets to clear, without interference, adjacent overlapping ones of said elongated support members.

19. The combination according to claim 15, further including a pivoting support block wherein the first one of said support members is attached to said pivoting support block, the axis of pivot of said pivoting support block being perpendicular to the elongated slots in said elongated support members.

* * * * *